(12) United States Patent
Sunde et al.

(10) Patent No.: US 6,365,053 B1
(45) Date of Patent: Apr. 2, 2002

(54) REMOVAL OF H$_2$S IN DRILLING MUD

(75) Inventors: Egil Sunde, Sandnes; Håvard Olsen, Hundvåg, both of (NO)

(73) Assignee: Statoil Asa, Stavanger (NO)

( * ) Notice: Subject to any disclaimer, the term of this patent is extended or adjusted under 35 U.S.C. 154(b) by 0 days.

(21) Appl. No.: 09/806,922

(22) PCT Filed: Oct. 6, 1999

(86) PCT No.: PCT/NO99/00304

§ 371 Date: Apr. 6, 2001

§ 102(e) Date: Apr. 6, 2001

(87) PCT Pub. No.: WO00/23538

PCT Pub. Date: Apr. 27, 2000

(30) Foreign Application Priority Data

Oct. 6, 1998 (NO) .......................................... 19984672

(51) Int. Cl.$^7$ ................................................. C02F 1/00
(52) U.S. Cl. ........................ 210/747; 210/757; 210/758
(58) Field of Search ................................ 210/747, 750, 210/757, 758, 911

(56) References Cited

U.S. PATENT DOCUMENTS

| | | | | |
|---|---|---|---|---|
| 3,928,211 A | * | 12/1975 | Browning et al. |
| 4,008,775 A | | 2/1977 | Fox |
| 4,147,212 A | * | 4/1979 | Tisdale |
| 4,246,243 A | | 1/1981 | Fox |
| 4,252,655 A | * | 2/1981 | Carney |
| 4,451,442 A | * | 5/1984 | Jeffrey et al. |
| 4,473,115 A | * | 9/1984 | Oakes |
| 4,756,836 A | * | 7/1988 | Jeffrey et al. |

\* cited by examiner

*Primary Examiner*—Betsey Morrison Hoey
(74) *Attorney, Agent, or Firm*—Wenderoth, Lind & Ponack, LLP

(57) ABSTRACT

A method for removing hydrogen sulfide in drilling mud comprises adding to the drilling mud which is circulated in a borehole a relatively sparingly soluble divalent iron salt having a solubility from 0.1 to 1000 ppm at room temperature in the drilling mud, whereby the hydrogen sulfide reacts with the divalent iron salt to form iron sulfide.

8 Claims, 2 Drawing Sheets

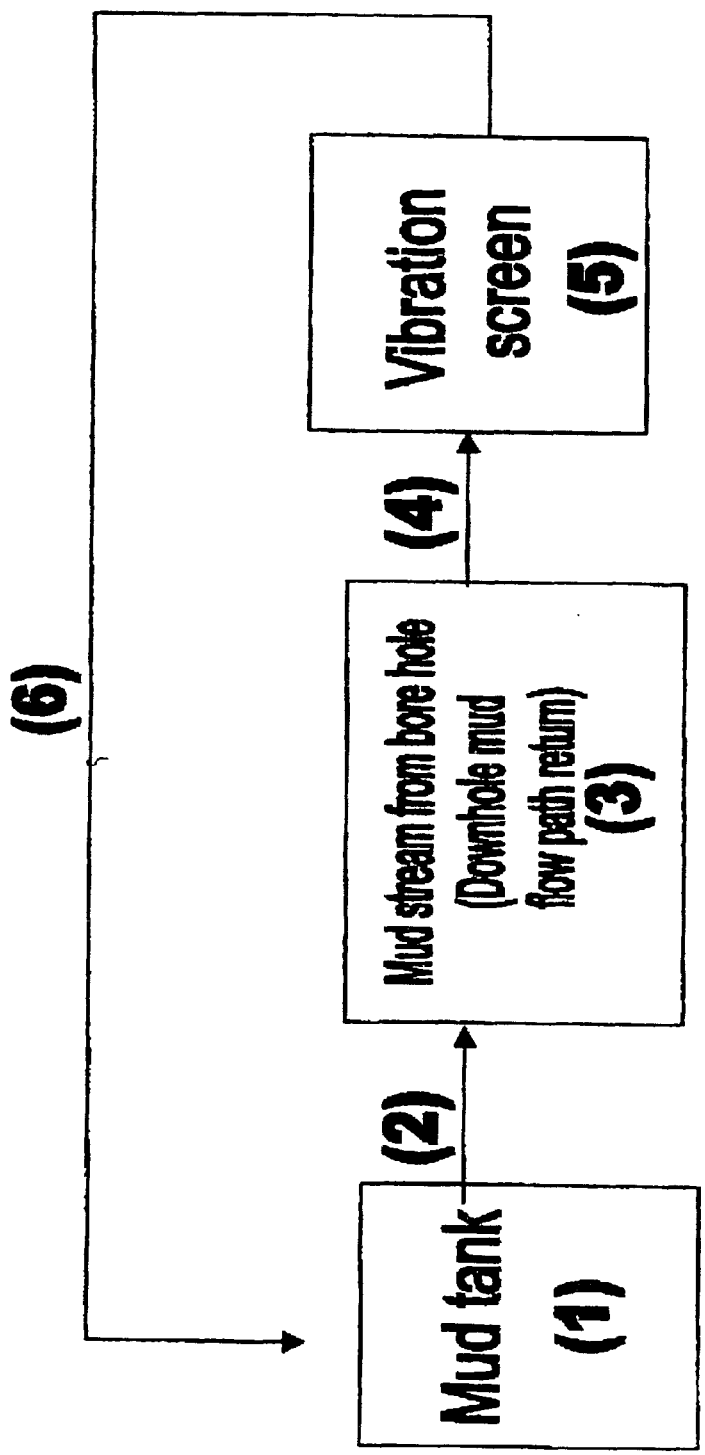
Figure 1: Cleaning of drilling mud

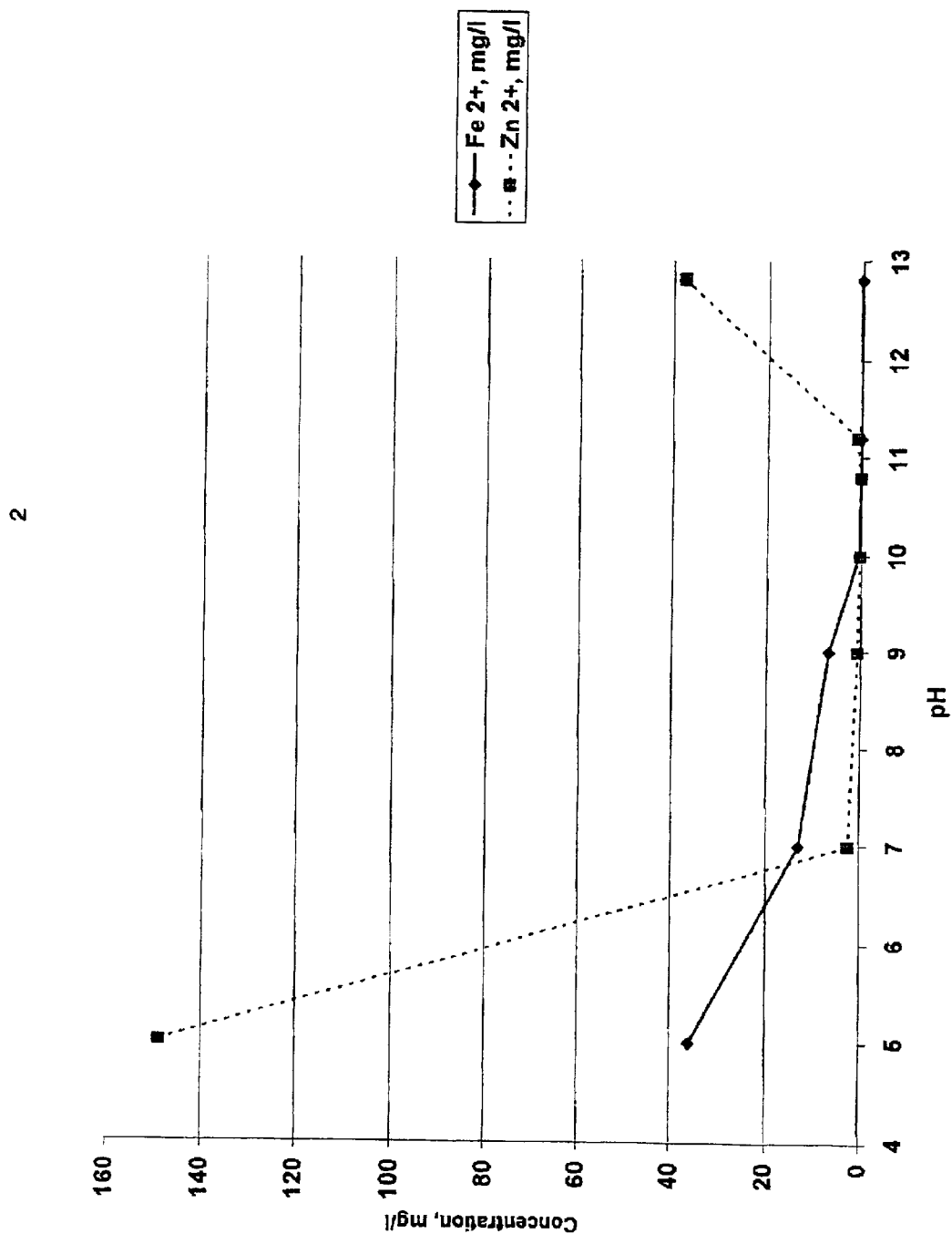
Figure 2: Solubility of $Fe^{2+}$ and $Zn^{2+}$ in 3% NaCl solution at room temperature.

REMOVAL OF H₂S IN DRILLING MUD

The present invention concerns a method for removal of H₂S in drilling mud, and use of a relatively sparingly soluble divalent iron salt in drilling mud.

During drilling for oil and gas hydrogen sulphide (H₂S) can come into drilling mud from formations or be formed from the drilling mud. H₂S is both poisonous and corrosive, and it is therefore necessary to remove it from the drilling mud/fluid. Today zinc carbonate and iron oxide are used. These two mentioned metal compounds have, however, limitations. Zinc carbonate, which can be used in all types of drilling mud, is not friendly to the environment, and effluents of this are therefore prohibited many places in the world. Iron oxide can only control H₂S at a lower pH than the pH which is usual in drilling mud.

Hydrogen sulphide (H₂S) is produced by bacteria in sea water or in formation water (connate water) where the mentioned bacteria are growing, with organic material (for instance crude oil) as a substrate, under anaerobic conditions. The reaction can be described by the following reaction equation:

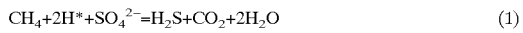

$$CH_4 + 2H^+ + SO_4^{2-} = H_2S + CO_2 + 2H_2O \qquad (1)$$

H₂S is a colourless gas which is easily soluble in solvents like water, alcohols and hydrocarbons. Low concentrations of H₂S in air smell like rotten eggs, but it is very important to be aware of that the smelling ability of humans is lowered at relatively low concentrations of the gas (100 ppm). When a water lock which has been closed for a longer period of time suddenly is opened, the characteristic smell of hydrogen sulphide can be recognised. Hydrogen sulphide has a density of 1.18 compared to air, which means that the gas is sinking against the lowest possible level, as for instance close to sludge tanks. The gas is forming an explosive mixture with air in concentrations of 4.3 to 45% H₂S, which is especially dangerous compared to methane which is combustible at concentrations ranging from 5 to 16%. H₂S has an ignition temperature of 260° C. and methane of 538° C. Hydrogen sulphide forms sulphur dioxide by combustion, and this is also a poisonous gas.

H₂S will be present in drilling mud/water either as H₂S, HS⁻, or S²⁻, depending on the pH-value. In drilling mud, which has a pH value from 7 to 13, bisulphide is dominating, which is water soluble arid not very dangerous for the environment. A common method of handling sulphide in drilling mud is therefore to increase the pH value with sodium hydroxide and/or lime. The hazard is, however, that by accumulation of soluble sulphide components in drilling mud, a drop in pH can liberate big amounts of H₂S gas from the sludge. It is therefore practical that sulphide containing components are reacting to more inert forms as i.a. precipitated and insoluble metal sulphides. The mentioned reactions can take place either by oxidation reactions wherein the sulphide is converted to harmless sulphur compounds, or by reactions leading to precipitation of sulphide containing compounds. In the last mentioned case the oxidation state of the sulphide ions is not altered. Reaction precipitation can be described as follows:

$$MX \rightleftharpoons M^{++} + X^{++} \qquad (2)$$

$$M^{++} + H_2S \rightarrow MS\downarrow + 2H^+ \qquad (3)$$

The expression sulphide scavengers (sulphide absorption agents) comprises any chemical substance which is added and which can react with one or more sulphide components to form more inert compounds. It is appropriate to add sulphide absorption agents to the drilling fluid in excess in relation to the amount of H₂S present or expected amount of H₂S supplied, to secure a fast removal of sulphide containing components. Known additives based on zinc, such as zinc carbonate, zinc hydroxide and organic zinc compounds provide effective sulphide absorption means and give irreversible reactions with the sulphides under formation of solid zinc sulphide. It has been preferred to use zinc as a metal ion because of its properties with regard to i.a. solubility and precipitation in drilling mud.

U.S. Pat. No. 3,928,211 describes a method for removal of H₂S in water containing drilling fluids and a number of known methods for the mentioned purpose. Zinc carbonate and zinc hydroxide are described as effective sulphide pickup substances. U.S. Pat. No. 4,252,655 comprises a method for removal of sulphide ions in both water and oil based drilling fluids with organic zinc chelates. U.S. Pat. No 3,928,211 and U.S. Pat. No. 4,252,655 are incorporated herein as references. It is as mentioned known to remove hydrogen sulphide during drilling for oil by adding zinc carbonate to the used drilling mud, but this is an environmentally unaccepted compound.

Additives such as flocculation and viscosifying agents are usually added to drilling fluids which can function as cleaning agents and thereby reduce the sulphide concentration with a few ppm. At normal shearing speeds and temperatures the sulphides can be oxidized to elementary sulphur by contact with air.

U.S. Pat. No. 4,756,836 comprises a method to reduce the amount of H₂S in drilling mud by oil drilling, whereby iron chelate is added, preferably In the form of EDTA, HEDTA, NTA or DTPA. Drilling mud wherein iron chelate has been added is passed down into a well and brought in contact with hydrogen sulphide under formation of elementary sulphur.

Singh, A. K. et al describe the use of Iron oxides to remove H₂S in drilling mud in the article <<Handling Hydrogen Sulphide in Drilling Fluids>>, part 2. The iron oxides are, however, nearly insoluble both in water and drilling fluids.

U.S. Pat. No. 4,805,708 comprises a method for determination of the amount of unused zinc based cleaning agent during oil drilling. The invention comprises selective dissolution and extracting of unused cleaning agent in a solvent such as e.g. glacial acetic acid, separation of the water containing solution and thereafter determination of the concentration of dissolved zinc in the mentioned solution. U.S. Pat. No. 4,805,708 describes zinc based cleaning agent in the form of zinc carbonate, which, however, is defined as injurious to health.

The present invention concerns a method for removal of H₂S by use of a relatively sparingly soluble divalent environmentally acceptable iron salt in both oil and water based drilling mud. It is of essential importance that the divalent iron salt which is used does not affect the properties of different types of drilling mud and that it does not have any negative environmental consequences. It is an important feature of the present invention that the divalent iron salt is sparingly soluble, but has a sufficient solubility in drilling mud to cause the present sulphide ions to precipitate as iron sulphide. Preferably the divalent iron salt is used in excess in relation to the amount of H₂S in the drilling mud.

According to the present invention it is of essential importance that compounds used in drilling mud remove sulphide containing components, and that the substances are not harmful to the environment. Known art does not comprise methods for removal of hydrogen sulphide by adding a environmentally friendly and relatively difficulty soluble divalent iron salt as well as use of the mentioned metal compound. The present invention is therefore on the background of known art considered to involve both technical and environmental advantages.

According to the present invention it is preferred that the divalent iron salt which is used for removal of $H_2S$ in drilling mud is iron oxalate. Iron oxalate is friendly to the environment, has a low solubility, but is high enough in alkaline environments for removal of $H_2S$ in drilling mud. It is maintaining the absorption ability for $H_2S$ over time in drilling mud without altering the physical properties of the mud. The iron salts which are used to remove hydrogen sulphide must be able to be used at alkaline conditions, where $H_2S$ is present as sulphide ions in solution and not as a gas. Divalent iron oxalate has as known lower solubility than trivalent iron oxalate, but it was surprisingly found that a divalent iron oxalate has sufficient solubility, so that sulphide containing compounds react with the divalent iron ions, and thereafter precipitating as iron sulphides.

The present invention comprises a method for removal of $H_2S$ in drilling mud where a relatively sparingly soluble divalent iron salt is added to the drilling mud which is circulated in a borehole; whereby hydrogen sulphide which is present in the drilling mud reacts with a relatively sparingly soluble iron salt to iron sulphide.

The invention is characterized by the fact that the divalent iron salt is added in excess in relation to the amount of $H_2S$ which is present or expected to be taken up into the drilling mud. It is preferred that the iron salt is added in an excess from 10% and up to 10 times, especially that the iron salt is added in an excess of 50% in relation to the amount of $H_2S$ which is present or expected to be taken up into the drilling mud. One of the objects of the present invention is to provide a depot of a difficulty soluble divalent iron salt, which is gradually dissolved in the drilling mud when it is reacting with $H_2S$. One of the advantages of the present invention is that the iron sulphide which has been formed can remain in the drilling mud without having influence on the mud. The divalent iron salt normally has a solubility of from 0.1 to 1000 ppm at room temperature in drilling mud, more preferred from 0.1 to 200 ppm and most preferred from 0.1 til 50 ppm. An especially preferred divalent iron salt is iron(II) oxalate. The drilling mud normally has a pH value from 8 to 12.5. Further the invention comprises the use of a relatively sparingly soluble divalent iron salt for removal of $H_2S$ in drilling mud. This iron salt is preferably iron(II) oxalate.

FIG. 1 shows a flow diagram of the present method.

FIG. 2 shows a comparison of the solubility of iron(II) oxalate and zinc carbonate.

FIG. 1 shows the addition of a divalent iron salt to mud in the mud tank (1) to which it is added. From the mud tank (1) mud to which a divalent iron salt has been added is passed down Into the borehole for precipitation of $H_2S$ in the form of iron sulphide. The mud stream from the borehole (3) is then passed through a pipeline (4) back to the mud tank via a vibration screen (5).

FIG. 2 shows as mentioned a diagram of the solubility of iron(II) oxalate and zinc carbonate in 3% NaCl solution at different pH-values at room temperature. From the diagram it can clearly be seen that divalent iron oxalate has a lower solubility than zinc carbonate at lower pH-values than approximately 7, whereas the solubility of zinc carbonate is higher at pH values higher than approximately 11.

The invention is further explained in the following examples.

EXAMPLE 1

The example comprises testing of durability of iron oxalate in non-aged mud over time. In A, B and C iron oxalate was added.

Iron oxalate, 400 mg, was added and 15 ml drilling mud was mixed in a tightly closed/sealed jar and was left at room temperature (ageing) as shown in table 1. Just before measurement of the effectiveness ($H_2S$-absorption) to the iron oxalate, 1.5 ml of an aqueous solution D containing $H_2S$ was added to the jar. The mixture was then shaken and centrifuged.

The mud used in the example was of the type NaBr/$CaCO_3$ sno 0301, SIT 1543, aged at a pH value of 11.15.

The results from example 1 are shown in table 1 below where the amount of $H_2S$ measured in ppm is stated in the right hand column:

| Sample | Ageing time (hours) | Amount of aqueous $H_2S$ solution (solution D) (ml) | Amount of remaining $H_2S$ in the mud sample (ppm) after shaking and centrifuging |
|---|---|---|---|
| Blank | 21 | 1.5 | 2158 |
| A | 21 | 1.5 | 68 |
| B | 25 | 1.5 | 17 |
| C | 64 | 1.5 | 6 |

The amount of remaining $H_2S$ in mud samples A, B and C after shaking and centrifuging shows that iron oxalate is stable in drilling mud because of the durability and that the efficiency of iron oxalate as a "cleaner" is durable. In the example a blank was carried out without addition of iron oxalate.

EXAMPLE 2

Example 2 comprises testing of the durability of iron oxalate in non-aged oil based mud over time. In A, B and C iron oxalate was added.

Iron oxalate, 400 mg, was added and 15 ml of drilling mud was mixed in a sealed jar and was left at room temperature (ageing) as shown in table 2. Just before measurement of the effectiveness ($H_2S$-absorption) of the iron oxalate, an aqueous solution D containing $H_2S$ was added to the sealed jar. The jar containing the mixture was then shaken. From this mixture a new sample of 1 ml mud was taken out with a syringe. This new sample consisting of 1 ml mud was mixed with 20 ml of water and further analysed in GGT (Garret Gas Train) whereby the mixture was stirred with a magnetic stirrer.

The mud which was used in example 2 was of the type interdrill 1.62 (density of the mud), wherein the pH value in the water phase is 12.5.

The amount of $H_2S$ measured in ppm is stated in table 2:

| Sample | Ageing time (hours) | Amount of aqueous $H_2S$ solution (solution D) (ml) | Amount of remaining $H_2S$ in the mud sample (ppm) measured by GGT analysis |
|---|---|---|---|
| Blank | 17 | 1.5 | 1125 |
| A | 17 | 1.5 | 51 |
| B | 40 | 1.5 | 34 |
| C | 64 | 1.5 | 57 |
| Blank | 64 | 1.5 | 784 |

Two blanks were also carried out in example 2 (indicated as Blank). Table 2 shows that iron oxalate is stable in drilling mud because of the durability and that the efficiency of iron oxalate as "cleaning agent" is durable. The right hand column in table 2 shows remaining amount of $H_2S$ in the mud sample after different ageing times by GGT analysis. The blank which was taken after 17 hours (indicated as Blank), was also tested after 64 hours, and the results showed that the amount of $H_2S$ after 64 hours was somewhat lower than in the blank taken after 17 hours. The reason for a lower $H_2S$ concentration after 64 hours is probably that oxidation of H2S has taken place in the stock solution (solution D) in the time interval from 17 to 64 hours.

EXAMPLE 3

Measurements at low concentrations of $H_2S$ were also carried out.

Iron oxalate, 200 mg, 15 ml mud and solution D (stock solution) was mixed in a sealed jar and was left at room temperature (ageing) as shown in table 3. From this mixture a new sample of 1 ml mud was taken out with a syringe and mixed with 20 ml of water and analysed in GGT (Garret Gas Train) whereby the mixture was stirred with a magnetic stirrer.

TABLE 3

| Sample | Ageing time (hours) | Amount of aqueous $H_2S$ solution (solution D) (ml) | Amount of remaining $H_2S$ in the mud sample (ppm) measured by GGT analysis |
|---|---|---|---|
| Blank | 1 | 1.5 | 107 |
| A | 1 | 1.5 | 8.5 |
| B | 18 | 1.5 | 0 |
| C | 25 | 1.5 | 0 |
| Blank | 25 | 1.5 | 98 |

Table 3 shows that at low concentrations of $H_2S$ it will be possible to reduce the amount $H_2S$ to a non-detectable level.

EXAMPLE 4

Example 4 shows the results of filter loss testing where addition/no addition of Iron oxalate to different types of mud for removal of $H_2S$ are shown in the tables. From the tables it is evident that the physical properties of the mud is not influenced by the addition of iron oxalate.

| Sample | A | B | C | D |
|---|---|---|---|---|
| Type of mud | betonite | betonite | betonite | betonite |
| Iron oxalate | no | yes | no | yes |
| Aged | no | no | yes | yes |
| Time (minutes) | Filter loss at 1000 psi ml filter loss | Filter loss at 1000 psi ml filter loss | Filter loss at 1000 psi ml filter loss | Filter loss at 1000 psi ml filter loss |
| 30 | 11.40 | 12.20 | 11.00 | 11.80 |
| Filter cake (mm) | 0.50 | 0.70 | 0.50 | 0.55 |

| Sample | E | F | G | H |
|---|---|---|---|---|
| Type of mud | KCl | KCl | KCl | KCl |
| Iron oxalate | no | yes | no | yes |
| Aged | no | no | yes | yes |
| Time (minutes) | Filter loss at 1000 psi ml filter loss | Filter loss at 1000 psi ml filter loss | Filter loss at 1000 psi ml filter loss | Filter loss at 1000 psi ml filter loss |
| 30 | 10.20 | 8.20 | 8.40 | 8.60 |
| Filter cake (mm) | 0.10 | 0.20 | 0.27 | 0.12 |

| Sample | I | J | K | L |
|---|---|---|---|---|
| Type of mud | Interdrill | Interdrill | Interdrill | Interdrill |
| Iron oxalate | no | yes | no | yes |
| Aged | no | no | yes | yes |
| Time (minutes) | Filter loss at 1000 psi ml filter loss | Filter loss at 1000 psi ml filter loss | Filter loss at 1000 psi ml filter loss | Filter loss at 1000 psi ml filter loss |
| 30 | 0 | 0 | 0 | 0 |
| Filter cake (mm) | not measurable | 0.10 | 0.80 | 0.12 |

| Sample | M | N | O | P |
|---|---|---|---|---|
| Type of mud | Interdrill | Interdrill | Interdrill | Interdrill |
| Iron oxalate | no | yes | no | yes |
| Aged | no | no | yes | yes |
| Time (minutes) | Filter loss at 2600 psi ml filter loss | Filter loss at 2600 psi ml filter loss | Filter loss at 2600 psi ml filter loss | Filter loss at 2600 psi ml filter loss |
| 30 | 10.60 | 0 | 0.60 | 0.55 |
| Filter cake (mm) | 1.90 | 0.20 | 0.14 | 0.19 |

EXAMPLE 5

Example 5 shows results of rheology testing by Fann reading of different mud types. The results also here show that the addition of iron oxalate does not influence the properties of different types of mud.

| Sample | Q | R | S | T |
|---|---|---|---|---|
| Type of mud | betonite | betonite | betonite | betonite |
| Iron oxalate | no | yes | no | yes |
| Aged | no | no | yes | yes |
| rpm | Rheology Fann reading | Rheology Fann reading | Rheology Fann reading | Rheology Fann reading |
| 600 | 100.0 | 172.0 | 116.0 | 122.0 |
| 300 | 71.0 | 126.0 | 87.0 | 94.0 |
| 200 | 59.0 | 115.0 | 77.0 | 84.0 |
| 100 | 46.0 | 98.0 | 65.0 | 70.0 |
| 60 | 40.0 | 92.0 | 59.5 | 64.0 |
| 30 | 36.0 | 87.0 | 55.0 | 59.0 |
| 6 | 31.0 | 86.0 | 49.0 | 52.5 |
| 3 | 30.5 | 86.0 | 49.0 | 52.5 |
| 3' | 28.0 | 82.0 | 45.0 | 50.0 |
| 3" | Not measurable | Not measurable | 100 | 78.0 |

| Sample | U | V | W | X |
|---|---|---|---|---|
| Type of mud | KCl | KCl | KCl | KCl |
| Iron oxalate | no | yes | no | yes |
| Aged | no | no | yes | yes |
| rpm | Rheology Fann reading | Rheology Fann reading | Rheology Fann reading | Rheology Fann reading |
| 600 | 28.0 | 23.0 | 22.0 | 23.0 |
| 300 | 21.0 | 17.5 | 17.0 | 17.5 |
| 200 | 17.0 | 15.0 | 14.0 | 14.5 |
| 100 | 12.0 | 11.0 | 10.5 | 10.5 |
| 60 | 10.5 | 9.0 | 9.0 | 9.0 |
| 30 | 8.0 | 7.5 | 7.5 | 7.5 |
| 6 | 5.5 | 5.0 | 5.0 | 5.5 |
| 3 | 5.0 | 4.0 | 4.0 | 4.5 |
| 3' | 3.0 | 3.0 | 4.0 | 3.0 |
| 3" | 3.0 | x | 3.5 | 3.0 |

-continued

| Sample | Y | Z | Æ | Ø |
|---|---|---|---|---|
| Type of mud | Interdrill | Interdrill | Interdrill | Interdrill |
| Iron oxalate | no | yes | no | yes |
| Aged | no | no | yes | yes |
| rpm | Rheology Fann reading | Rheology Fann reading | Rheology Fann reading | Rheology Fann reading |
| 600 | 108.0 | 100.5 | 120.0 | 102.5 |
| 300 | 66.0 | 61.0 | 75.0 | 62.0 |
| 200 | 51.5 | 47.0 | 57.5 | 48.0 |
| 100 | 35.5 | 32.5 | 38.0 | 32.0 |
| 60 | 28.5 | 25.0 | 30.0 | 25.0 |
| 30 | 22.0 | 20.0 | 22.5 | 18.5 |
| 6 | 15.0 | 14.0 | 14.5 | 12.5 |
| 3 | 15.0 | 12.5 | 14.5 | 12.0 |
| 3' | 12.0 | 12.0 | 12.0 | 11.5 |
| 3" | Not measurable | Not measurable | 22.0 | 19.0 |

What is claimed is:

1. Method for removal of $H_2S$ in drilling mud, wherein:
   (a) to the drilling mud which is circulated in a borehole there is added a relatively sparingly soluble divalent iron salt in which the divalent iron salt has a solubility from 0.1 to 1000 ppm at room temperature in drilling mud;
   (b) whereafter hydrogen sulphide which is present in the drilling mud reacts with a relatively sparingly soluble divalent iron salt to form iron sulphide.

2. Method according to claim 1, wherein the divalent iron salt is added in excess in relation to the amount of $H_2S$ which is present/expected to be taken up into the drilling mud.

3. Method according to claim 1, wherein the divalent iron salt preferably is added in 10% excess and up to 10 times excess in relation to the amount of $H_2S$ which is present/expected to be taken up into the drilling mud.

4. Method according to claim 1, wherein the divalent iron salt especially is added in an excess of 50% in relation to the amount of $H_2S$ which is present/expected to be taken up into the drilling mud.

5. Method according to claim 1, wherein the divalent iron salt has a solubility from 0.1 to 200 ppm at room temperature in drilling mud.

6. Method according to claim 1, wherein the divalent iron salt has a solubility from 0.1 to 50 ppm at room temperature in drilling mud.

7. Method according to claim 1, wherein the divalent iron salt is iron(II) oxalate.

8. Method according to claim 1, wherein the drilling mud has a pH value of from 8 to 12.5.

* * * * *